(12) United States Patent
Yen

(10) Patent No.: US 8,893,445 B2
(45) Date of Patent: Nov. 25, 2014

(54) SOLAR MODULE

(71) Applicant: AU Optronics Corporation, Hsin-Chu (TW)

(72) Inventor: Tung-I Yen, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 86 days.

(21) Appl. No.: 13/688,337

(22) Filed: Nov. 29, 2012

(65) Prior Publication Data

US 2014/0044471 A1 Feb. 13, 2014

(30) Foreign Application Priority Data

Aug. 13, 2012 (CN) .......................... 2012 1 0287351

(51) Int. Cl.
| | | |
|---|---|---|
| *F24J 2/54* | (2006.01) | |
| *F16C 11/04* | (2006.01) | |
| *F16C 11/10* | (2006.01) | |
| *F24J 2/52* | (2006.01) | |
| *H01L 31/042* | (2014.01) | |
| *F16B 9/02* | (2006.01) | |

(52) U.S. Cl.
CPC ................. *F16C 11/04* (2013.01); *F16C 11/10* (2013.01); *F24J 2/523* (2013.01); *F24J 2/5264* (2013.01); *F24J 2/541* (2013.01); *H01L 31/0422* (2013.01); *F16C 11/045* (2013.01); *F16B 9/023* (2013.01)
USPC .......... 52/173.3; 126/623; 136/245; 136/251; 248/237

(58) Field of Classification Search
USPC .......... 52/173.3; 126/623, 624; 136/244, 245, 136/251; 248/237
See application file for complete search history.

(56) References Cited

U.S. PATENT DOCUMENTS

| | | | | |
|---|---|---|---|---|
| 3,691,712 | A | * | 9/1972 | Bowling et al. .................. 52/393 |
| 4,129,360 | A | * | 12/1978 | Deflandre et al. ............ 359/853 |
| 4,245,895 | A | * | 1/1981 | Wildenrotter ................. 359/848 |
| 4,371,139 | A |   | 2/1983 | Clark |
| 4,421,943 | A | * | 12/1983 | Withjack ....................... 136/246 |
| 4,452,234 | A | * | 6/1984 | Withjack ....................... 126/627 |
| 4,620,771 | A | * | 11/1986 | Dominguez .................. 359/591 |
| 4,641,798 | A | * | 2/1987 | De Haan et al. ........... 244/172.9 |

(Continued)

FOREIGN PATENT DOCUMENTS

| | | | | |
|---|---|---|---|---|
| CN | 101847665 A | * | 9/2010 | |
| CN | 202363477 U | * | 8/2012 | |

(Continued)

*Primary Examiner* — Basil Katcheves
*Assistant Examiner* — Rodney Mintz
(74) *Attorney, Agent, or Firm* — WPAT, PC; Justin King

(57) ABSTRACT

A solar module includes a first supporting element, a first clamping assembly, a first pivotal member, and a frame. A first fixing hole of the first supporting element has a first and second dented portions. A first angle is formed between two connection lines respectively connecting the apexes of the first and second dented portions to the center of the first fixing hole. A second fixing hole of the first clamping assembly has a third and fourth dented portions. A second angle is formed between two connection lines respectively connecting the apexes of the third and fourth dented portions to the center of the second fixing hole. The pivotal member is pivotally connected to the first and second fixing holes. A protruding portion of the pivotal member can be engaged with the first and third dented portions or with the second and fourth dented portions.

12 Claims, 13 Drawing Sheets

(56) References Cited

U.S. PATENT DOCUMENTS

| | | | | |
|---|---|---|---|---|
| 4,880,188 A * | 11/1989 | Roth et al. | | 244/172.6 |
| 5,037,043 A * | 8/1991 | Roth et al. | | 244/172.6 |
| 5,125,608 A * | 6/1992 | McMaster et al. | | 248/163.1 |
| 5,356,095 A * | 10/1994 | Aker | | 244/172.6 |
| 5,577,843 A * | 11/1996 | Leininger et al. | | 384/275 |
| 5,826,832 A * | 10/1998 | Stich et al. | | 244/172.6 |
| 5,911,536 A * | 6/1999 | Roth | | 403/119 |
| 6,046,399 A * | 4/2000 | Kapner | | 136/244 |
| 6,058,930 A | 5/2000 | Shingleton | | 126/600 |
| 6,205,719 B1 * | 3/2001 | Bruce | | 52/147 |
| 6,421,966 B1 * | 7/2002 | Braunstein et al. | | 52/173.3 |
| 6,809,251 B2 * | 10/2004 | Dinwoodie | | 136/251 |
| 7,435,134 B2 * | 10/2008 | Lenox | | 439/567 |
| 7,476,832 B2 * | 1/2009 | Vendig et al. | | 250/203.4 |
| 7,513,250 B2 * | 4/2009 | Head et al. | | 126/605 |
| 7,531,741 B1 * | 5/2009 | Melton et al. | | 136/246 |
| 7,634,875 B2 * | 12/2009 | Genschorek | | 52/173.3 |
| 7,780,472 B2 * | 8/2010 | Lenox | | 439/567 |
| 7,814,899 B1 * | 10/2010 | Port | | 126/623 |
| 7,849,849 B2 * | 12/2010 | Genschorek | | 126/704 |
| 8,015,759 B1 * | 9/2011 | Bruce | | 52/146 |
| 8,100,122 B2 * | 1/2012 | Collins et al. | | 126/623 |
| 8,101,849 B2 * | 1/2012 | Almy et al. | | 136/246 |
| 8,122,682 B2 * | 2/2012 | Mischo | | 52/747.1 |
| 8,177,180 B2 * | 5/2012 | Plaisted et al. | | 248/237 |
| 8,324,496 B1 * | 12/2012 | Gross et al. | | 136/246 |
| 8,505,864 B1 * | 8/2013 | Taylor et al. | | 248/237 |
| 8,511,297 B2 * | 8/2013 | McNeil-Yeckel et al. | | 126/600 |
| 8,578,666 B2 * | 11/2013 | Yen | | 52/173.3 |
| 8,623,158 B2 * | 1/2014 | Stanley | | 156/71 |
| 8,661,747 B2 * | 3/2014 | Eide | | 52/173.3 |
| 8,671,631 B2 * | 3/2014 | Schroeder et al. | | 52/173.3 |
| 8,726,897 B2 * | 5/2014 | Wallgren | | 126/571 |
| 8,740,163 B1 * | 6/2014 | Taylor et al. | | 248/237 |
| 8,752,343 B2 * | 6/2014 | Kuan et al. | | 52/173.3 |
| 8,807,839 B2 * | 8/2014 | Jang | | 384/432 |
| 8,813,441 B2 * | 8/2014 | Rizzo | | 52/173.3 |
| 8,826,606 B2 * | 9/2014 | Yen | | 52/173.3 |
| 8,832,938 B2 * | 9/2014 | Gies et al. | | 29/890.033 |
| 2004/0007260 A1 * | 1/2004 | Dinwoodie | | 136/251 |
| 2004/0163338 A1 * | 8/2004 | Liebendorfer | | 52/173.1 |
| 2007/0151594 A1 * | 7/2007 | Mascolo et al. | | 136/245 |
| 2008/0040990 A1 * | 2/2008 | Vendig et al. | | 52/173.3 |
| 2008/0121273 A1 * | 5/2008 | Plaisted et al. | | 136/251 |
| 2009/0165841 A1 * | 7/2009 | Gunn et al. | | 136/245 |
| 2009/0199846 A1 * | 8/2009 | Collins et al. | | 126/601 |
| 2010/0089390 A1 * | 4/2010 | Miros et al. | | 126/608 |
| 2010/0175337 A1 * | 7/2010 | Mascolo et al. | | 52/173.3 |
| 2010/0243023 A1 * | 9/2010 | Patton et al. | | 136/244 |
| 2010/0269888 A1 * | 10/2010 | Johnston, Jr. | | 136/251 |
| 2011/0023867 A1 * | 2/2011 | Muchow et al. | | 126/623 |
| 2011/0173900 A1 * | 7/2011 | Plaisted et al. | | 52/97 |
| 2011/0240101 A1 * | 10/2011 | Sagayama et al. | | 136/251 |
| 2011/0278411 A1 * | 11/2011 | Carbonare et al. | | 248/237 |
| 2012/0006317 A1 * | 1/2012 | Sade | | 126/600 |
| 2012/0291374 A1 * | 11/2012 | Zante | | 52/173.3 |
| 2012/0312355 A1 * | 12/2012 | Patton et al. | | 136/251 |
| 2012/0318322 A1 * | 12/2012 | Lanyon et al. | | 136/244 |
| 2013/0092215 A1 * | 4/2013 | Schroeder et al. | | 136/251 |
| 2013/0205692 A1 * | 8/2013 | Hubbard et al. | | 52/173.3 |
| 2014/0000186 A1 * | 1/2014 | Yen | | 52/173.3 |
| 2014/0014155 A1 * | 1/2014 | Seery et al. | | 136/244 |
| 2014/0060626 A1 * | 3/2014 | Stephan et al. | | 136/251 |
| 2014/0069483 A1 * | 3/2014 | Wolter et al. | | 136/246 |
| 2014/0069484 A1 * | 3/2014 | Kuan et al. | | 136/251 |
| 2014/0083504 A1 * | 3/2014 | Kuo | | 136/259 |
| 2014/0102016 A1 * | 4/2014 | Hemingway | | 52/173.3 |
| 2014/0182663 A1 * | 7/2014 | Kuo et al. | | 136/251 |
| 2014/0252192 A1 * | 9/2014 | Kuan et al. | | 248/346.03 |

FOREIGN PATENT DOCUMENTS

| | | |
|---|---|---|
| EP | 2532987 A2 * | 12/2012 |
| JP | 2009302123 A * | 12/2009 |
| TW | M387229 | 8/2010 |
| TW | M390360 | 10/2010 |
| TW | M413842 | 10/2011 |
| WO | 9503631 A1 | 2/1995 |
| WO | WO 2014026398 A1 * | 2/2014 |

* cited by examiner

SOLAR MODULE

RELATED APPLICATIONS

This application claims priority to China Application Serial Number 201210287351.6, filed Aug. 13, 2012, which is herein incorporated by reference.

BACKGROUND

1. Technical Field

The present disclosure relates to a solar module, and more particularly, to a supporting assembly of a frame of the solar module.

2. Description of Related Art

With the raising awareness of the importance of environmental protection in recent years, constant efforts have been made to develop technologies related to alternative energy and renewable energy, so as to reduce the dependence on fossil fuels and the impact on the environment caused by fossil energy. Among the various kinds of technologies related to alternative energy and renewable energy, the solar cell is a promising technology receiving much attention in that solar cells can directly convert solar energy into electricity, and that carbon dioxide or other harmful substances, such as nitrogen compounds, to the environment will not be produced during the process of power generation.

A solar apparatus normally includes a plurality of solar cell modules and an inverter. Each of the solar cell modules includes a plurality of solar cells that are connected to each other in series, and each of the solar cell modules use a junction box to electrically connect another junction box of another solar cell module. In general, the solar cell modules included in the solar apparatus that are electrically connected to the inverter in series can be arranged in a single row or in double rows, and a plurality of supporting assemblies support under a frame of the solar cell module.

However, the frame and supporting assemblies for supporting a conventional solar cell module are usually made of aluminum friction materials or angle steel materials, which incurs high costs and market price. Concerning the shipping and handling, the frame and the supporting assemblies appear to be too heavy and space-occupying space to be easily installed at attic. Particularly, during transportation, the antioxidant layers on surfaces of the frame and the supporting assemblies of the solar cell module are apt to be peeled off or scraped due to collisions, so as to deform and rust the surfaces of the frame and the supporting assemblies.

Furthermore, the commercially available supporting assemblies have complicated structures and a large number of components. Some connection structures of the supporting assemblies even require assemblage of electric welding, which results in nonadjustable assembled structures (i.e., the supporting assemblies that can not be adjusted to keep the solar module at a desired angle for receiving light). Therefore, the solar cells in the solar cell module become circuit loads because the solar cell module does not receive light well or is sheltered, thereby reducing the lifetime of the solar apparatus.

SUMMARY

In order to solve the problems of the prior art, the disclosure provides an improved solar module. Particularly, the solar module adopts at least one supporting element and at least one clamping assembly that are lightweight and can be quickly assembly to support a frame of the solar module, so as to replace a conventional supporting assembly that has a plurality of lateral and longitudinal brackets. A protruding portion of a pivotal member of the disclosure is selectively engaged with one of dented portions of the supporting element and one of dented portions of the clamping assembly, so that the clamping assembly can support the frame at different tilted states. A clamped edge of the frame of the disclosure forms a protruding structure having special shape and can be clamped by the two-piece clamping assembly, so that the frame can be fixed relative to the clamping assembly in three directions that are perpendicular to each other. Furthermore, the solar module of the disclosure is lightweight and modularized, so the sizes and the quantity of components included in the solar module can be reduced, thereby obtaining advantages of reducing assembly hours and costs.

According to an embodiment of the disclosure, a solar module includes a first supporting element, a first clamping assembly, a first pivotal member, and a frame. The first supporting element has a first fixing hole. The first fixing hole has a first dented portion and a second dented portion. A first angle is formed between two connection lines respectively connecting the apexes of the first dented portion and the second dented portion to the center of the first fixing hole. The first clamping assembly has a second fixing hole. The second fixing hole has a third dented portion and a fourth dented portion. A second angle is formed between two connection lines respectively connecting the apexes of the third dented portion and the fourth dented portion to the center of the second fixing hole. The second angle is not equal to the first angle. The first pivotal member is pivotally connected to the first fixing hole and the second fixing hole, and has a protruding portion. The frame has a first clamped edge. The first clamped edge is clamped by the first clamping assembly. The protruding portion of the first pivotal member is selectively engaged with the first dented portion and the third dented portion to make the first clamping assembly support the frame at a first tilted state, or is engaged with the second dented portion and the fourth dented portion to make the first clamping assembly support the frame at a second tilted state.

In an embodiment of the disclosure, the first angle is equal to 180 degrees, and the second angle is not equal to 180 degrees.

In an embodiment of the disclosure, the first angle is not equal to 180 degrees, and the second angle is equal to 180 degrees.

In an embodiment of the disclosure, the frame further has a second clamped edge. The first clamped edge and the second clamped edge are respectively located at two opposite sides of the frame. The solar module further includes a second supporting element, a second clamping assembly, and a second pivotal member. The second supporting element has a fifth fixing hole and a sixth fixing hole. The second clamping assembly has a seventh fixing hole. The second clamping assembly is used for clamping the second clamped edge. The fifth fixing hole is aligned with the seventh fixing hole when the frame is at the first tilted state, and the sixth fixing hole is aligned with the seventh fixing hole when the frame is at the second tilted state. The second pivotal member is selectively pivotally connected to the fifth fixing hole and the seventh fixing hole corresponding to the first tilted state, or is pivotally connected to the sixth fixing hole and the seventh fixing hole corresponding to the second tilted state.

In an embodiment of the disclosure, the first pivotal member further has a retaining portion and a threaded hole. The retaining portion is located at an end of the first pivotal member. The solar module further includes a first bolt. The first bolt has bolt head. The first bolt is fastened into the threaded hole from another end of the first pivotal member opposite to the retaining portion, so as to clamp the first supporting element and the first clamping assembly between the retaining portion and the bolt head.

In an embodiment of the disclosure, the first clamped edge is a protruding structure laterally protruding from the frame.

In an embodiment of the disclosure, the first clamped edge includes a connection portion, a first extension portion, and a second extension portion. The connection portion is connected to the frame and has a first supporting surface and a second supporting surface. The first supporting surface and the second supporting surface are respectively located at two opposite sides of the connection portion. The first extension portion is connected to the first supporting surface. The second extension portion is connected to the second supporting surface.

In an embodiment of the disclosure, the first clamping assembly includes a lower clamping member, an upper clamping member, a second bolt, and a nut. The lower clamping member includes a lower body, a bolt mount, and a lower abutting portion. The bolt mount is connected to the lower body. The lower abutting portion is connected to the lower body and located at an edge of the lower body for abutting the second supporting surface. The upper clamping member includes an upper body and an upper abutting portion. The upper body has a through hole. The upper abutting portion is connected to the upper body and located at an edge of the upper body for abutting the first supporting surface. The second bolt is fixed to the bolt mount and passes through the through hole. The nut is fastened to the second bolt, so as to clamp the upper clamping member between the nut and the lower clamping member. The connection portion is clamped between the upper abutting portion and the lower abutting portion. The first extension portion is clamped between the upper abutting portion and the bolt mount. The second extension portion is engaged between the lower abutting portion and the bolt mount.

In an embodiment of the disclosure, the lower clamping member further includes a pivotal portion. The pivotal portion is connected to the lower body. The pivotal portion and the bolt mount are respectively located at two opposite sides of the lower body, and the first fixing hole is located at the pivotal portion.

In an embodiment of the disclosure, the pivotal portion further includes a first sleeve, a second sleeve, and a fastening member. The first sleeve is connected to the lower body and has a first fastening hole and a second fastening hole. The second sleeve is sleevedly connected to the first sleeve and has a third fastening hole. The first sleeve is capable of rotating relative to the second sleeve, so as to selectively make the first fastening hole or the second fastening hole be aligned with the third fastening hole. The fastening member is selectively fastened to the first fastening hole and the third fastening hole that are aligned to each other, or fastened to the second fastening hole and the third fastening hole that are aligned to each other.

In an embodiment of the disclosure, a cross section of the first clamped edge is T-shaped or X-shaped.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
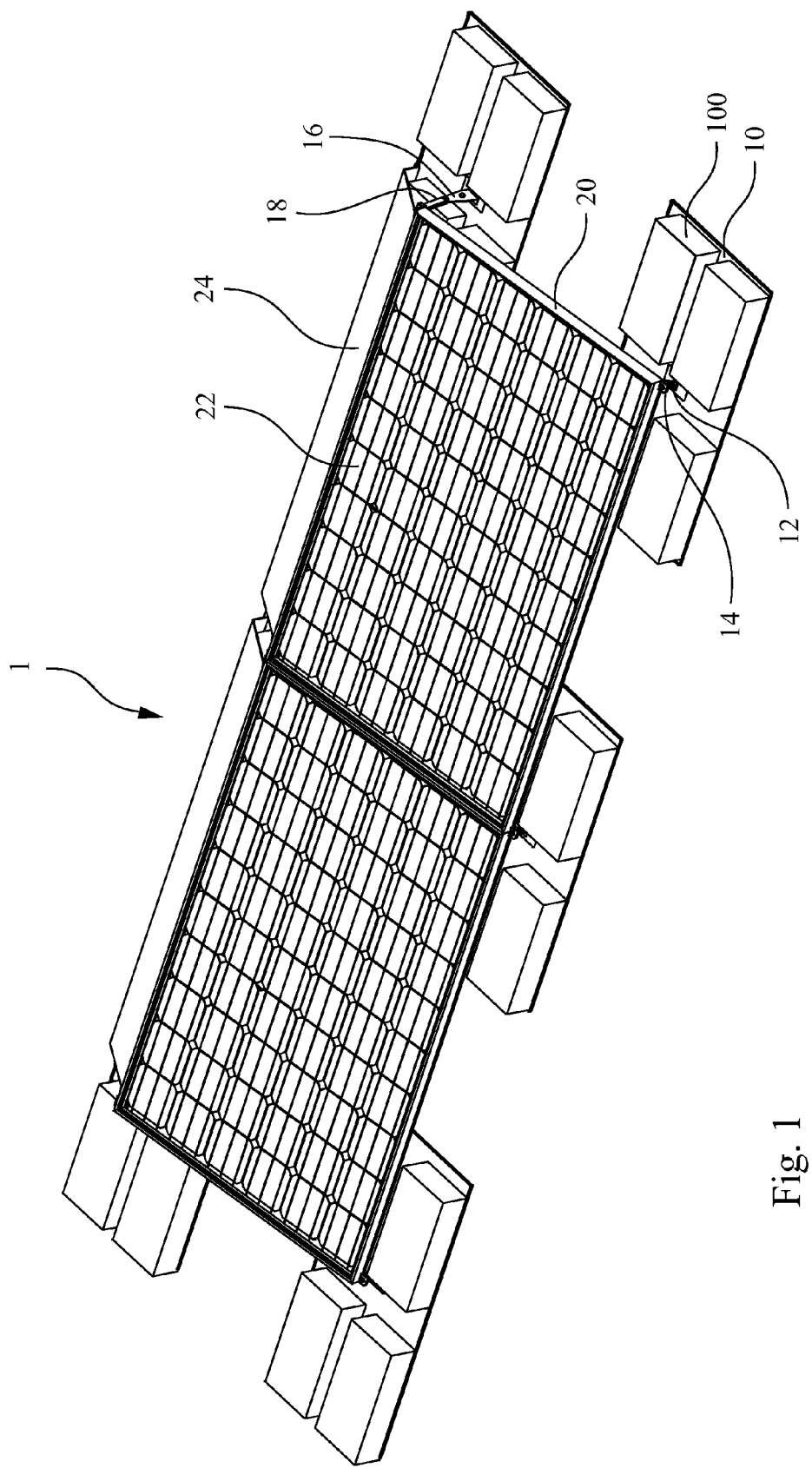
FIG. 1 is a perspective view of a solar module according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2A:
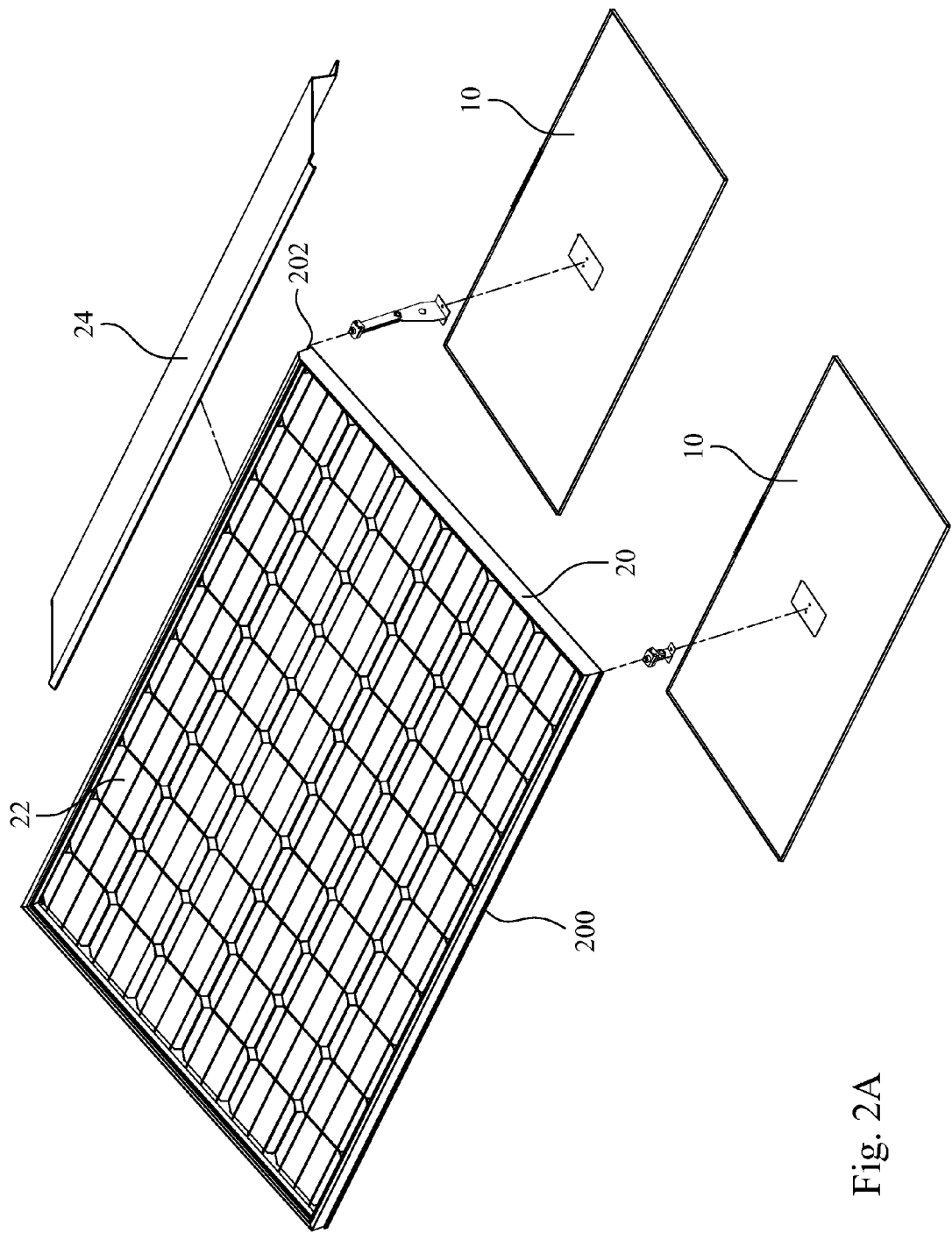
FIG. 2A is an exploded view of some components of the solar module in FIG. 1.
Figure 2B:
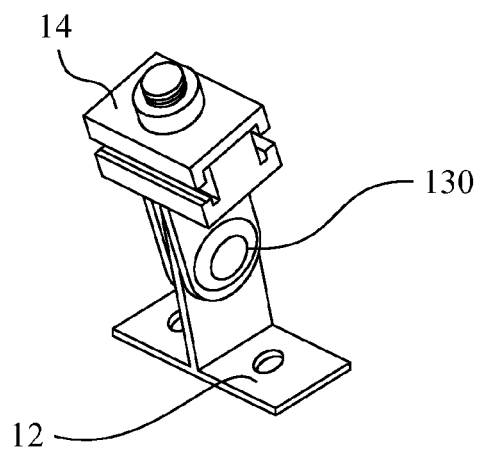
FIG. 2B is a perspective view of a first supporting element in FIG. 2A.
Figure 2C:
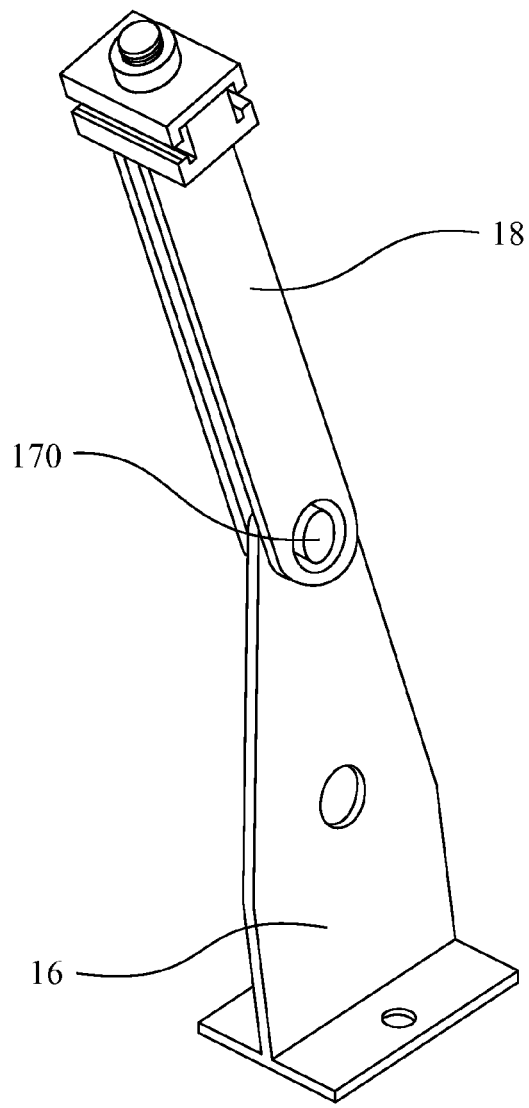
FIG. 2C is a perspective view of a second supporting element in FIG. 2A.

FIG. 1 is a perspective view of a solar module 1 according to an embodiment of the disclosure. FIG. 2A is an exploded view of some components of the solar module 1 in FIG. 1. FIG. 2B is a perspective view of a first supporting element 12 in FIG. 2A. FIG. 2C is a perspective view of a second supporting element 16 in FIG. 2A.

As shown in FIG. 1, FIG. 2A, FIG. 2B and FIG. 2C, the solar module 1 at least includes a carrying tray 10, a load object 100, a first supporting element 12, a first clamping assembly 14, a second supporting element 16, a second clamping assembly 18, a frame 20, solar cells 22, and a windshields 24. The carrying tray 10 of the solar module 1 is installed with a first supporting element 12 or a second supporting element 16. The first supporting element 12 and the first clamping assembly 14 of the solar module 1 can be assembled to each other, and the second supporting element 16 and the second clamping assembly 18 can be assembled to each other. The frame 20 of the solar module 1 is used to support cell arrays arranged by the solar cells 22, and the frame 20 has a first clamped edge 200 and a second clamped edge 202. The first clamped edge 200 and the second clamped edge 202 of the frame 20 are respectively located at two opposite sides of the frame 20. The first clamping assembly 14 of the solar module 1 is used to clamp the first clamped edge 200 of the frame 20, and the second clamping assembly 18 is used to clamp the second clamped edge 202 of the frame 20.

In the embodiment of the disclosure, two first clamping assemblies 14 of the solar module 1 respectively clamp two ends of the first clamped edge 200, and two second clamping assemblies 18 respectively clamp two ends of the second clamped edge 202 (i.e., each of the first clamping assemblies 14 and the second clamping assemblies 18 clamps at a corresponding corner of the frame 20). Each of the carrying trays 10 of the solar module 1 is located under a corresponding corner of the frame 20. Each of the first supporting elements 12 and the second supporting elements 16 is fixed to the center of a corresponding carrying tray 10, and each of the carrying trays 10 is installed with four load objects 100 surrounding the corresponding first supporting element 12 or the corresponding second supporting element 16. Therefore, the solar module 1 of the embodiment can steadily and firmly erect. However, in a practical case, the portion of the first clamped edge 200 at which the first clamping assembly 14 of the solar module 1 clamps, the portion of the second clamped edge 202 at which the second clamping assembly 18 clamps, the location of each of the carrying trays 10 relative to the frame 20, the location of each of the carrying trays 10 at which the first supporting element 12 or the second supporting element 16 is fixed, and the quantity of the load objects 100 installed on each of the carrying trays 10 are not limited by the embodiment and can be adjusted according to requirements of designing or limitations of practical layout.

Furthermore, in the embodiment of the disclosure, two opposite edges of each of the windshields 24 of the solar module 1 are respectively fixed to a side of the frame 20 and a carrying tray 10 (especially to the carrying tray 10 to which the second supporting element 16 is fixed). The windshields 24 of the solar module 1 are in streamlined shapes from the carrying tray 10 to the frame 20. Because the length of the second supporting element 16 and the second clamping assembly 18 of the solar module 1 after assembled is greater that the length of the first supporting element 12 and the first clamping assembly 14 after assembled, the distance between the portion of the frame 20 clamped by the second clamping assembly 18 and the corresponding carrying tray 10 is greater than the distance between the portion of the frame 20 clamped by the first clamping assembly 14 and the corresponding carrying tray 10. If a strong wind flows through the second supporting element 16 and the second clamping assembly 18 to the bottom of the frame 20, the frame 20 may be entirely lifted. By installing the foregoing windshields 24, the disclosure can prevent the frame 20 from being entirely lifted due to the strong wind blew to the bottom of the frame 20.

Figure 3:
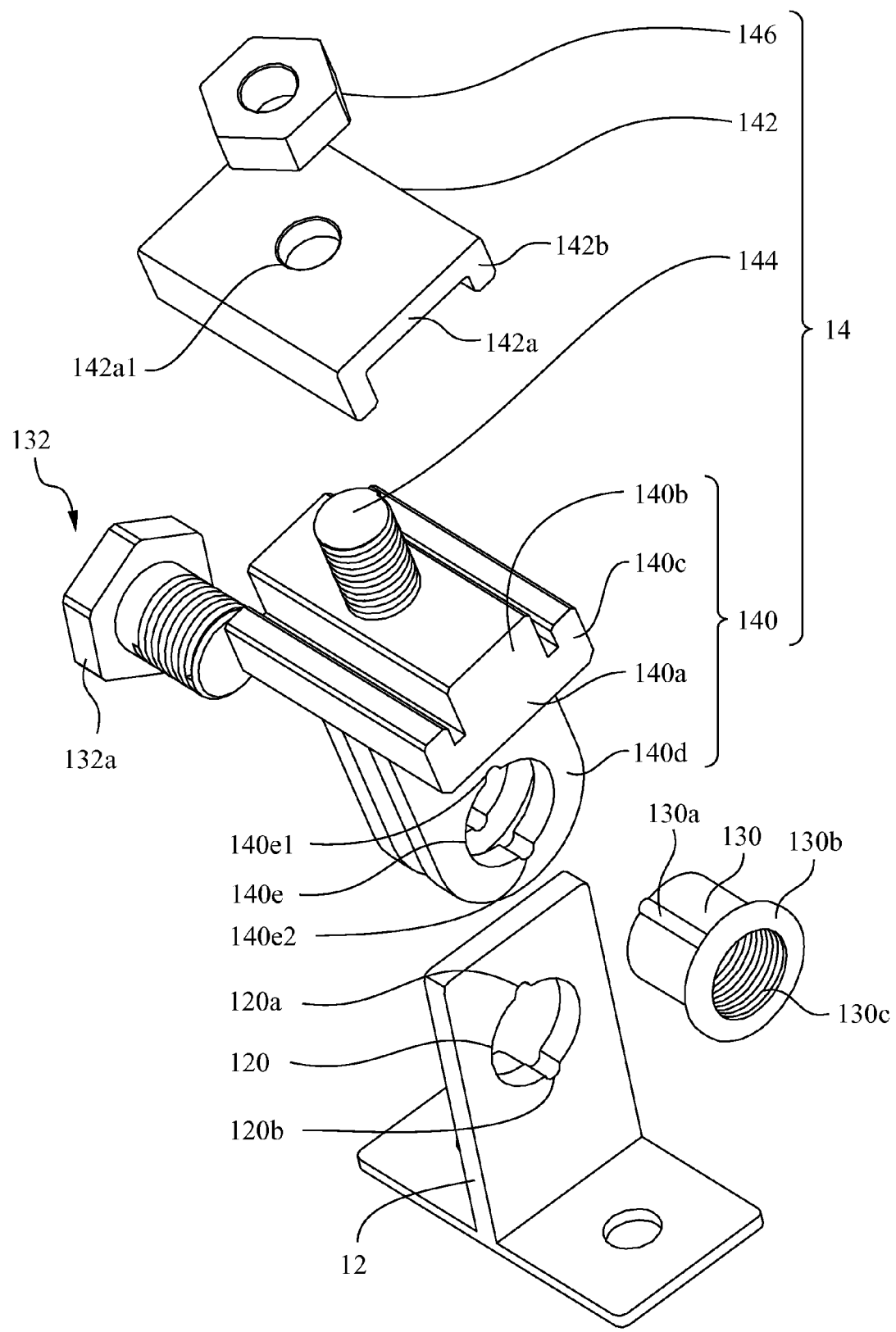
FIG. 3 is an exploded view of the first supporting element and a first clamping assembly in FIG. 2A.
Figure 4A:
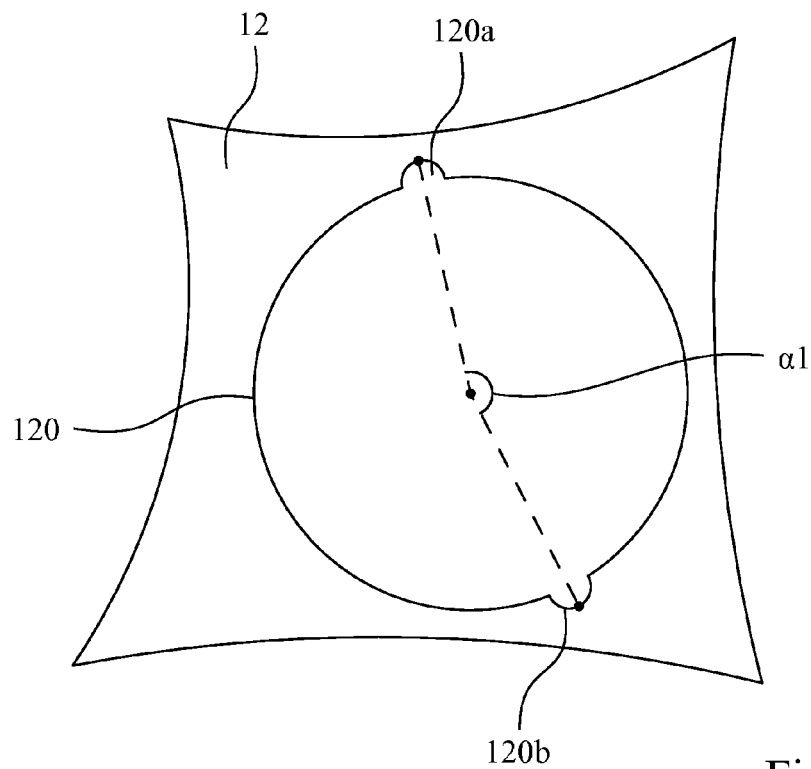
FIG. 4A is a partial side view of the first supporting element in FIG. 3.
Figure 4B:
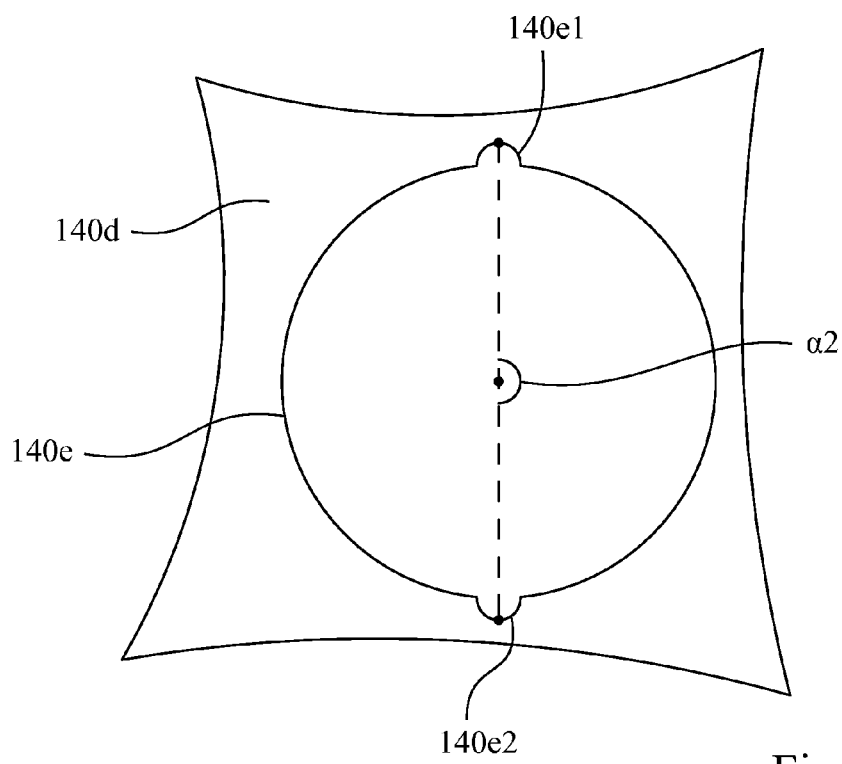
FIG. 4B is a partial side view of the first clamping assembly in FIG. 3.

FIG. 3 is an exploded view of the first supporting element 12 and the first clamping assembly 14 in FIG. 2A. FIG. 4A is a partial side view of the first supporting element 12 in FIG. 3. FIG. 4B is a partial side view of the first clamping assembly 14 in FIG. 3.

As shown in FIG. 3, FIG. 4A, and FIG. 4B, the solar module 1 further includes a first pivotal member 130 and a first bolt 132. The first supporting element 12 of the solar module 1 has a first fixing hole 120. The first fixing hole 120 of the first supporting element 12 has a first dented portion 120a and a second dented portion 120b. A first angle α1 is formed between two connection lines respectively connecting the apexes of the first dented portion 120a and the second dented portion 120b of the first fixing hole 120 to the center of the first fixing hole 120 (as shown in FIG. 4A). The first clamping assembly 14 of the solar module 1 has a second fixing hole 140e. The second fixing hole 140e of the first clamping assembly 14 has a third dented portion 140e1 and a fourth dented portion 140e2. A second angle α2 is formed between two connection lines respectively connecting the apexes of the third dented portion 140e1 and the fourth dented portion 140e2 of the second fixing hole 140e to the center of the second fixing hole 140e (as shown in FIG. 4B), and the second angle α2 is not equal to the first angle α1. The first pivotal member 130 of the solar module 1 is pivotally connected to the first fixing hole 120 of the first supporting element 12 and the second fixing hole 140e of the first clamping assembly 14, and has a protruding portion 130a. Therefore, the protruding portion 130a of the first pivotal member 130 can be selectively engaged with the first dented portion 120a of the first fixing hole 120 and the third dented portion 140e1 of the second fixing hole 140e to make the first clamping assembly 14 support the frame 20 at a first tilted state, or can be engaged with the second dented portion 120b of the first fixing hole 120 and the fourth dented portion 140e2 of the second fixing hole 140e to make the first clamping assembly 14 support the frame 20 at a second tilted state (as shown in FIG. 1).

In the embodiment of the disclosure, the first angle α1 is equal to 180 degrees, and the second angle α2 is equal to 175 degrees. Therefore, when the protruding portion 130a is engaged with the first dented portion 120a and the third dented portion 140e1 or with second dented portion 120b and the fourth dented portion 140e2, the angle difference formed between the frame 20 respectively at the first tilted state and the second tilted state is 5 degrees. That is, the angle difference between the first angle α1 and the second angle α2 is equal to the angle difference formed between the frame 20 respectively at the first tilted state and the second tilted state. However, the first angle α1 and the second angle α2 are not limited in this regard and can be adjusted as needs.

In another embodiment of the disclosure, in order to achieve the purpose of making the frame 20 be at the first tilted state or the second tilted state, the disclosure can also make the first angle α1 be 175 degrees and the second angle α2 be 180 degrees.

Furthermore, if the quantity of the tilted states of the frame 20 of the solar module 10 is desired to be increased, additional dented portions that can be matched to each other can be respectively formed on the first fixing hole 120 of the first supporting element 12 and the second fixing hole 140e of the first clamping assembly 14 according to the foregoing principles.

In addition, as shown in FIG. 3, the first pivotal member 130 of the solar module 1 further has a retaining portion 130b and a threaded hole 130c. The retaining portion 130b of the first pivotal member 130 is located at an end of the first pivotal member 130, and the threaded hole 130c passes through two ends of the first pivotal member 130. The first bolt 132 of the solar module 1 has bolt head 132a. The first bolt 132 of the solar module 1 is fastened into the threaded hole 130c from another end of the first pivotal member 130 opposite to the retaining portion 130b, so that the first supporting element 12 and the first clamping assembly 14 can be firmly clamped between the retaining portion 130b of the first pivotal member 130 and the bolt head 132a of the first bolt 132 after the first supporting element 12 and the first clamping assembly 14 are pivotally connected to each other by the first pivotal member 130.

Figure 5:
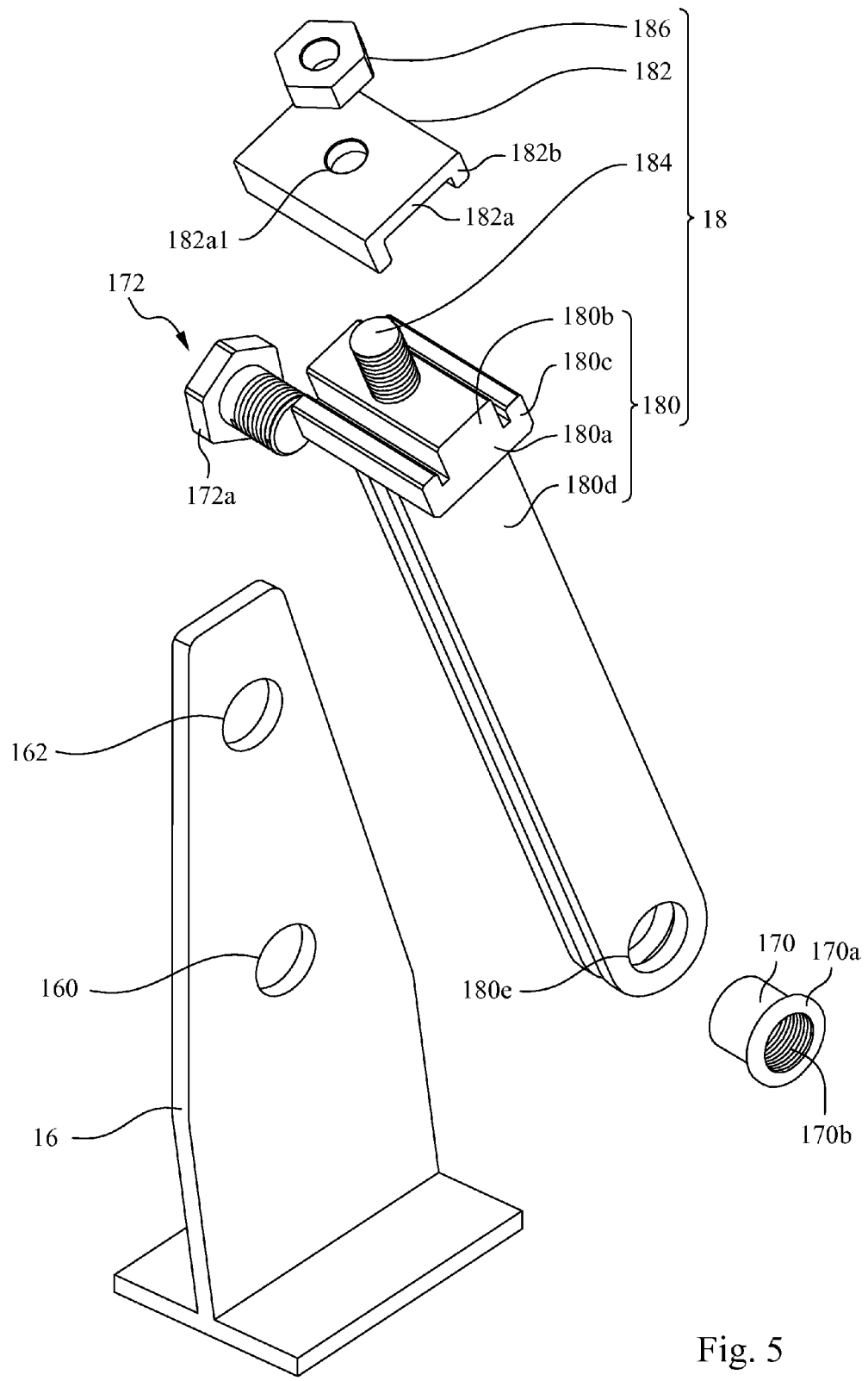
FIG. 5 is an exploded view of the second supporting element and a second clamping assembly in FIG. 2A.

FIG. 5 is an exploded view of the second supporting element 16 and the second clamping assembly 18 in FIG. 2A.

As shown in FIG. 5, the solar module 1 further includes a second pivotal member 170 and another first bolt 172. The second supporting element 16 of the solar module 1 has a fifth fixing hole 160 and a sixth fixing hole 162. The second clamping assembly 18 of the solar module 1 has a seventh fixing hole 180e. The fifth fixing hole 160 of the second supporting element 16 is aligned with the seventh fixing hole 180e of the second clamping assembly 18 when the frame 20 of the solar module 1 is at the first tilted state, and the sixth fixing hole 162 of the second supporting element 16 is aligned with the seventh fixing hole 180e of the second clamping assembly 18 when the frame of the solar module 1 is at the second tilted state. Therefore, the second pivotal member 170 of the solar module 1 can be selectively pivotally connected to the fifth fixing hole 160 of the second supporting element 16 and the seventh fixing hole 180e of the second clamping assembly 18 corresponding to the first tilted state, or can be pivotally connected to the sixth fixing hole 162 of the second supporting element 16 and the seventh fixing hole 180e of the second clamping assembly 18 corresponding to the second tilted state.

In another embodiment of the disclosure, a fixing hole similar to the first fixing hole 120 of the first supporting element 12 can also be formed on the second supporting element 16 to replace the fifth fixing hole 160 and/or the sixth fixing hole 162, a fixing hole similar to the second fixing hole 140e of the first clamping assembly 14 can also be formed on the second clamping assembly 18 to replace the seventh fixing hole 180e, and a protruding portion similar to the protruding portion 130a of the first pivotal member 130 can also be formed on the second pivotal member 170. Therefore, no matter that the first supporting element 12 and the first clamping assembly 14 are assembled early to clamp the first clamped edge 200 of the frame 20, or that the second supporting element 16 and the second clamping assembly 18 are assembled early to clamp the second clamped edge 202 of the frame 20, the frame 20 can also be fixed to be at the first tilted state or the second tilted state.

In addition, as shown in FIG. 5, the second pivotal member 170 of the solar module 1 further has a retaining portion 170a and a threaded hole 170b. The retaining portion 170a of the second pivotal member 170 is located at an end of the second pivotal member 170, and the threaded hole 170b passes through two ends of the second pivotal member 170. The first bolt 172 of the solar module 1 has bolt head 172a. The first bolt 172 of the solar module 1 is fastened into the threaded hole 170b from another end of the second pivotal member 170 opposite to the retaining portion 170a, so that the second supporting element 16 and the second clamping assembly 18 can be firmly clamped between the retaining portion 170a of the second pivotal member 170 and the bolt head 172a of the first bolt 172 after the second supporting element 16 and the second clamping assembly 18 are pivotally connected to each other by the second pivotal member 170.

Figure 6:
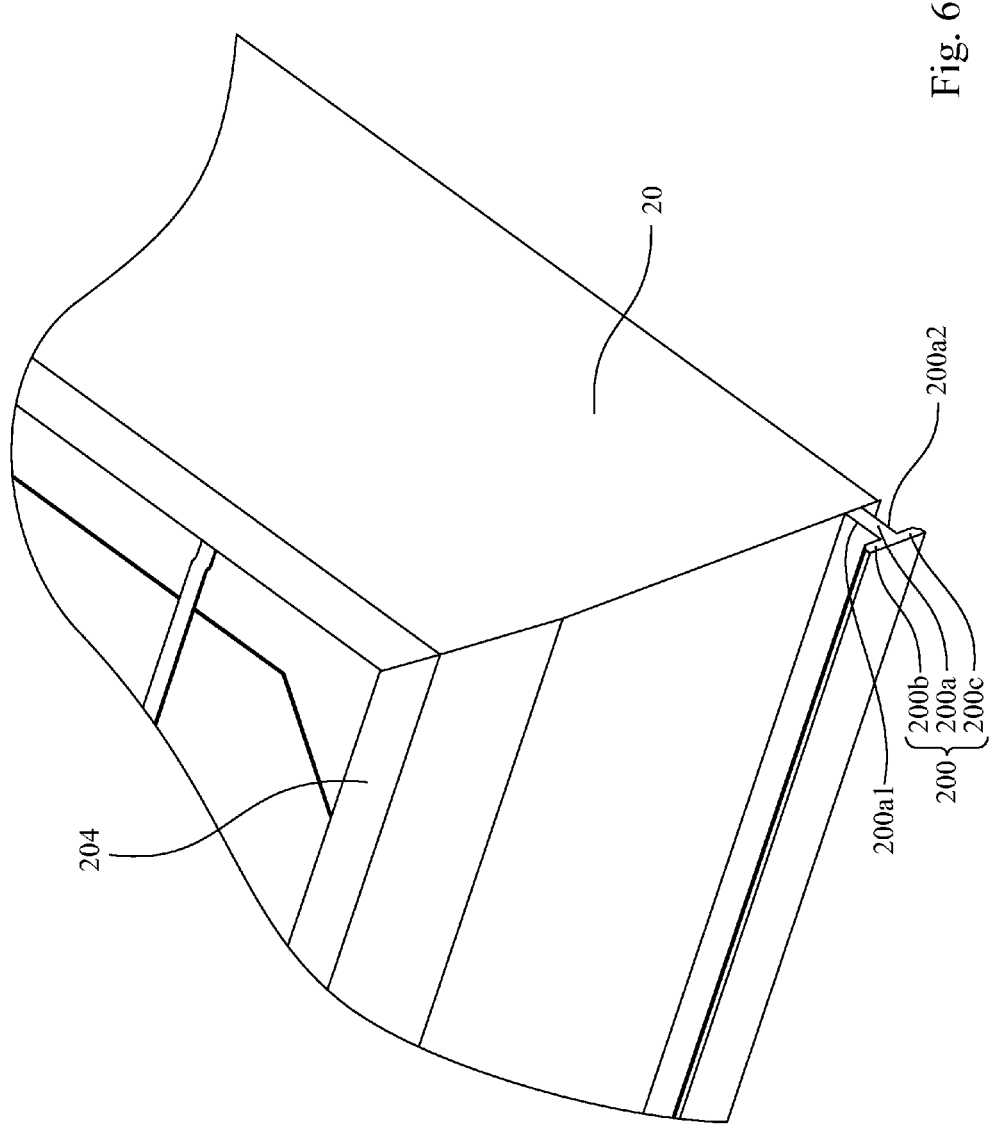
FIG. 6 is a partial perspective view of a frame in FIG. 2A.

FIG. 6 is a partial perspective view of a frame 20 in FIG. 2A.

As shown in FIG. 6, the first clamped edge 200 of the frame 20 is a protruding structure. That is, the first clamped edge 200 of the frame 20 laterally protrudes from the frame 20. The first clamped edge 200 of the frame 20 includes a connection portion 200a, a first extension portion 200b, and a second extension portion 200c. The connection portion 200a of the first clamped edge 200 is connected to the frame 20 and has a first supporting surface 200a1 and a second supporting surface 200a2. The first supporting surface 200a1 and the second supporting surface 200a2 of the connection portion 200a are respectively located at two opposite sides of the connection portion 200a (i.e., the upper side and the lower side of the connection portion 200a in FIG. 6). The first extension portion 200b of the first clamped edge 200 is connected to the first supporting surface 200a1 of the connection portion 200a. The second extension portion 200c of the first clamped edge 200 is connected to the second supporting surface 200a2 of the connection portion 200a.

Figure 7:
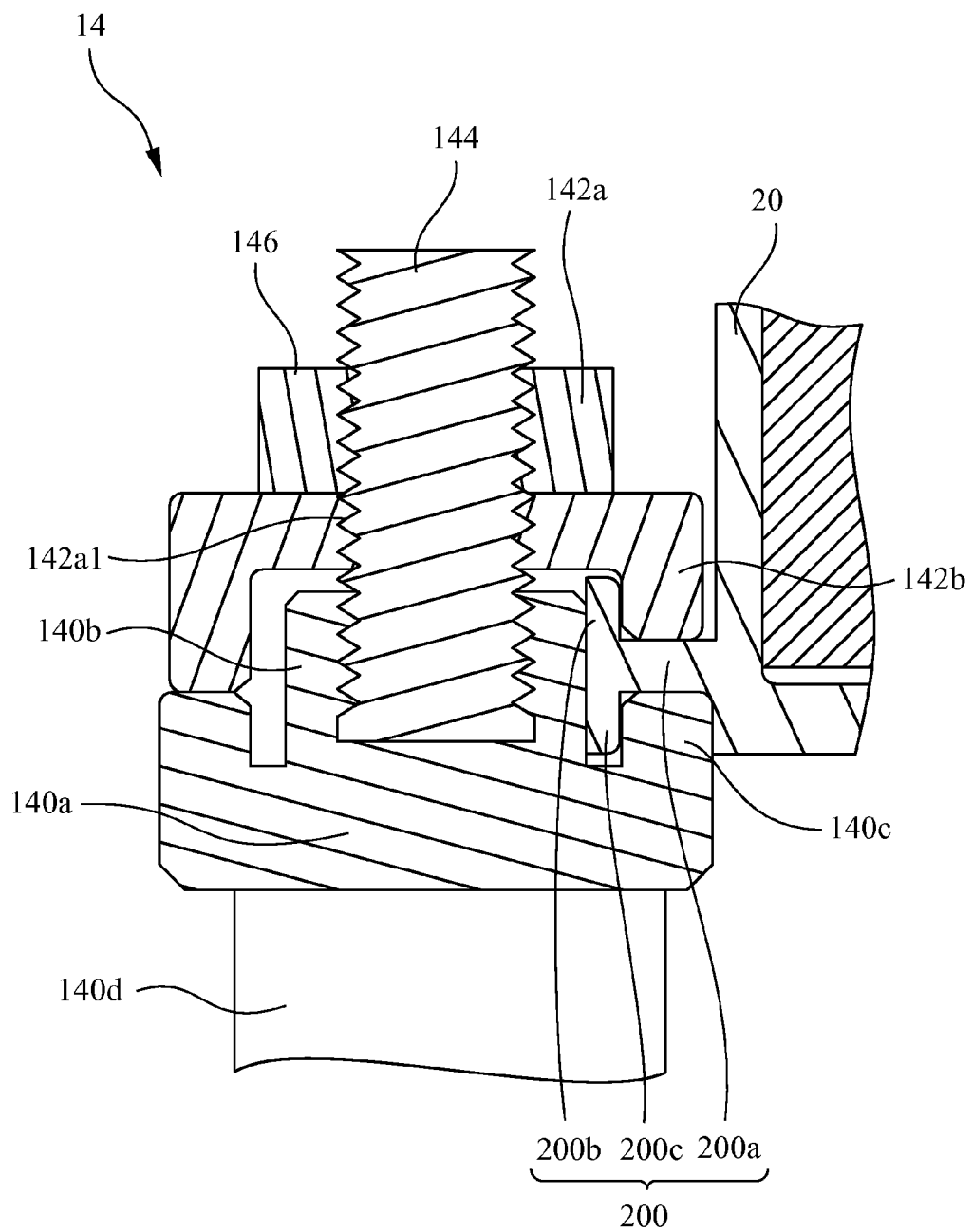
FIG. 7 is a partial sectional view of the first clamping assembly and the frame in FIG. 1.

FIG. 7 is a partial sectional view of the first clamping assembly 14 and the frame 20 in FIG. 1.

As shown in FIG. 3 and FIG. 7, the first clamping assembly 14 of the solar module 1 includes a lower clamping member 140, an upper clamping member 142, a second bolt 144, and a nut 146. The lower clamping member 140 of the first clamping assembly 14 includes a lower body 140a, a bolt mount 140b, and a lower abutting portion 140c. The bolt mount 140b of the lower clamping member 140 is connected to the lower body 140a. The lower abutting portion 140c of the lower clamping member 140 is connected to the lower body 140a and located at an edge of the lower body 140a for abutting the second supporting surface 200a2 of the connection portion 200a. The upper clamping member 142 of the first clamping assembly 14 includes an upper body 142a and an upper abutting portion 142b. The upper body 142a of the upper clamping member 142 has a through hole 142a1. The upper abutting portion 142b of the upper clamping member 142 is connected to the upper body 142a and located at an edge of the upper body 142a for abutting the first supporting surface 200a1 of the connection portion 200a. The second bolt 144 of the first clamping assembly 14 is fixed to the bolt mount 140b of the lower clamping member 140 and passes through the through hole 142a1 of the upper body 142a. The nut 146 of the first clamping assembly 14 is fastened to the second bolt 144, so as to clamp the upper clamping member 142 between the nut 146 and the lower clamping member 140. The connection portion 200a of the first clamped edge 200 is clamped between the upper abutting portion 142b of the upper clamping member 142 and the lower abutting portion 140c of the lower clamping member 140. The first extension portion 200b of the first clamped edge 200 is clamped between the upper abutting portion 142b of the upper clamping member 142 and the bolt mount 140b of the lower clamping member 140. The second extension portion 200c of the first clamped edge 200 is engaged between the lower abutting portion 140c and the bolt mount 140b of the lower clamping member 140. Furthermore, the lower clamping member 140 of the first clamping assembly 14 further includes a pivotal portion 140d. The pivotal portion 140d of the lower clamping member 140 is connected to the lower body 140a. The pivotal portion 140d and the bolt mount 140b of the lower clamping member 140 are respectively located at two opposite sides of the lower body 140a, and the first fixing hole 120 is located at the pivotal portion 140d.

Therefore, after the first clamping assembly 14 of the solar module 1 clamps the first clamped edge 200 of the frame 20, the frame 20 of the solar module 1 can be fixed relative to the first clamping assembly 14 in three directions that are perpendicular to each other (i.e., one of the directions is parallel to the connection portion 200a in FIG. 7, one of the directions is perpendicular to the connection portion 200a in FIG. 7, and one of the directions is perpendicular to the drawing of FIG. 7).

Furthermore, as shown in FIG. 5, FIG. 6, and FIG. 7, the second clamped edge 202 of the frame 20 is also a protruding structure and includes structures like the connection portion 200a, the first extension portion 200b, and the second extension portion 200c of the first clamped edge 200. The second clamping assembly 18 of the solar module 1 also includes a lower clamping member 180, an upper clamping member 182, a second bolt 184, and a nut 186. The lower clamping member 180 of the second clamping assembly 18 includes a lower body 180a, a bolt mount 180b, and a lower abutting portion 180c. The upper clamping member 182 of the second clamping assembly 18 includes an upper body 182a and an upper abutting portion 182b. The upper body 182a of the upper clamping member 182 has a through hole 182a1. The lower clamping member 180 of the second clamping assembly 18 further includes a pivotal portion 180d. Therefore, the mechanisms and principles according to which the second clamping assembly 18 of the solar module 1 clamps the second clamped edge 202 of the frame 20 can be referred to FIG. 3, FIG. 7, and the descriptions about that the first clamping assembly 14 clamps the first clamped edge 200.

Figure 8:
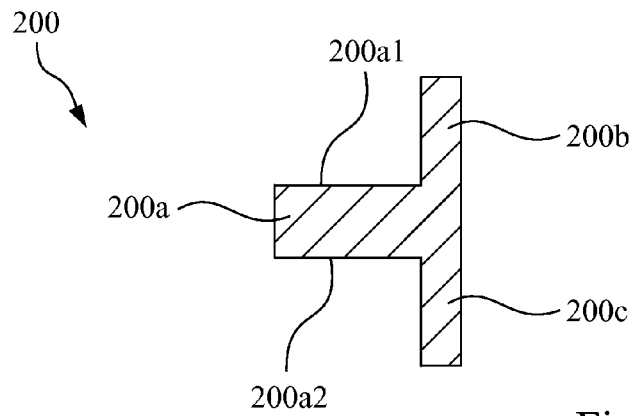
FIG. 8 is a sectional view of a first clamped edge in FIG. 6.

FIG. 8 is a sectional view of a first clamped edge 200 in FIG. 6.

As shown in FIG. 6 and FIG. 8, the frame 20 of the solar module 1 has a light-receiving surface 204. A cross section of the first clamped edge 200 of the frame 20 that is perpendicular to the light-receiving surface 204 is T-shaped. That is, the first extension portion 200b of the first clamped edge 200 is connected to an end of the connection portion 200a, and the second extension portion 200c of the first clamped edge 200 is also connected to the end of the connection portion 200a. In other words, the first extension portion 200b and the second extension portion 200c are located at the end of the connection portion 200a and aligned with each other. However, the shape of the cross section the first clamped edge 200 of the frame 20 is not limited in this regard.

Figure 9:
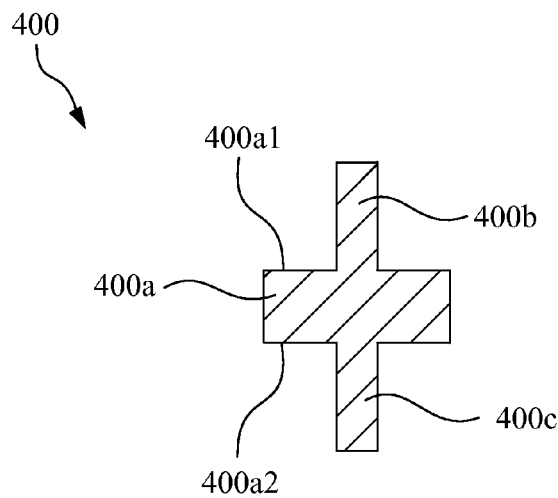
FIG. 9 is a sectional view of a first clamped edge according to another embodiment of the disclosure.

FIG. 9 is a sectional view of a first clamped edge 400 according to another embodiment of the disclosure.

As shown in FIG. 9, a cross section of the first clamped edge 400 of the frame 20 is X-shaped. That is, a first extension portion 400b of the first clamped edge 400 is not connected to an end of a connection portion 400a, and a second extension portion 400c of the first clamped edge 400 is also not connected to the end of the connection portion 400a. Furthermore, the first extension portion 400b and the second extension portion 400c of the first clamped edge 400 are aligned with each other.

Figure 10:
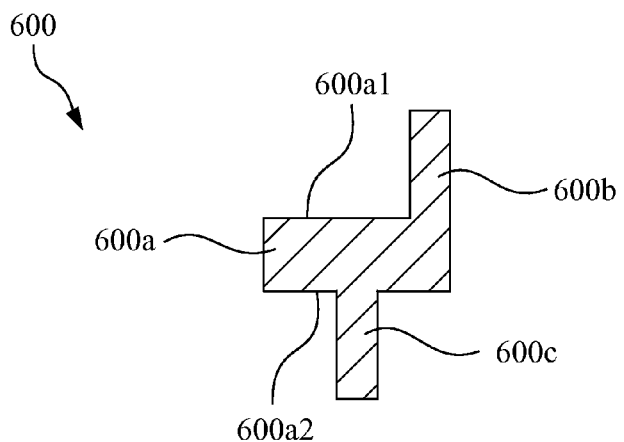
FIG. 10 is a sectional view of a first clamped edge according to another embodiment of the disclosure.

FIG. 10 is a sectional view of a first clamped edge 600 according to another embodiment of the disclosure.

As shown in FIG. 10, a first extension portion 600b of the first clamped edge 600 is connected to an end of a connection portion 600a, and a second extension portion 600c of the first clamped edge 600 is also not connected to the end of the connection portion 600a. Furthermore, the first extension portion 600b and the second extension portion 600c of the first clamped edge 600 are not aligned with each other.

Figure 11:
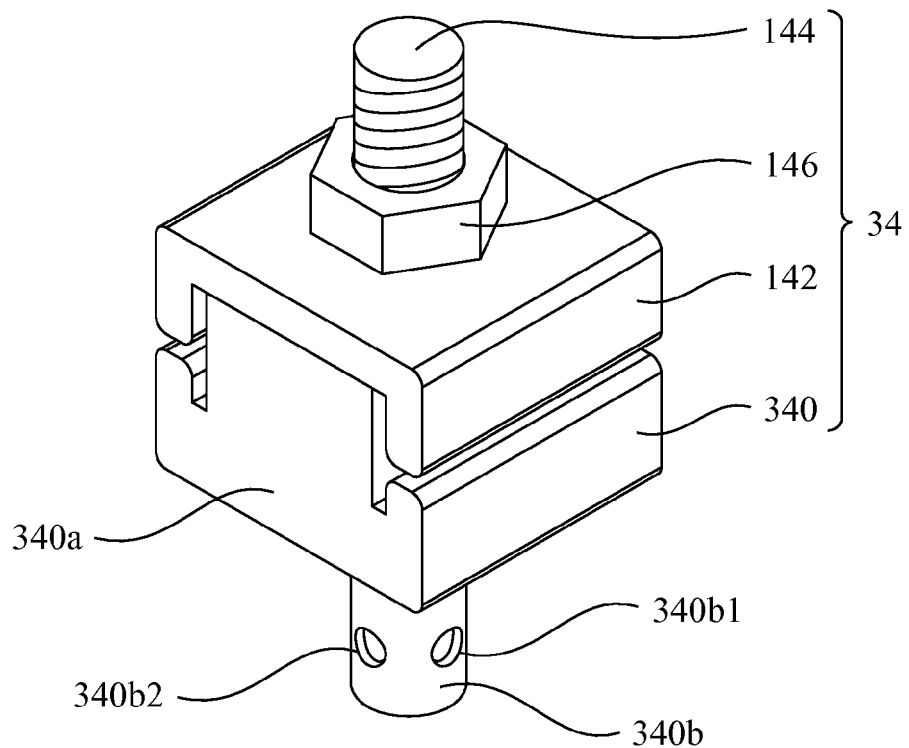
FIG. 11 is a perspective view of a first clamping assembly according to another embodiment of the disclosure, in which a first sleeve, a second sleeve, and a fastening member are separated.
Figure 11:
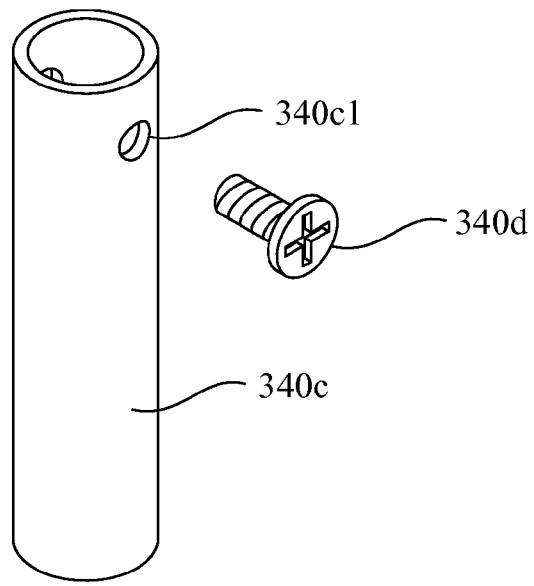
Figure 12B:
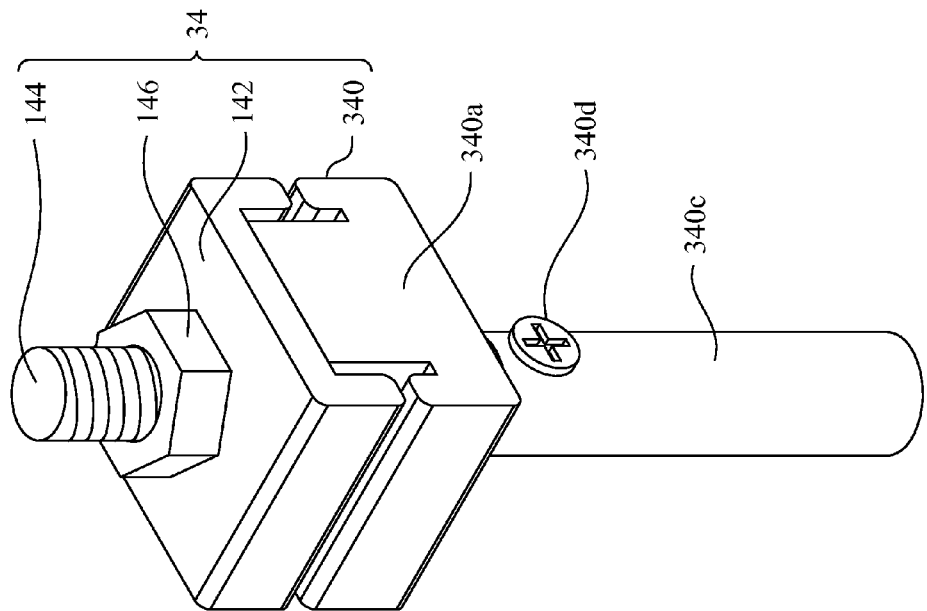
FIG. 12B is another perspective view of the first clamping assembly in FIG. 11, in which the fastening member is fastened to a second fastening hole and the third fastening hole.
Figure 12A:
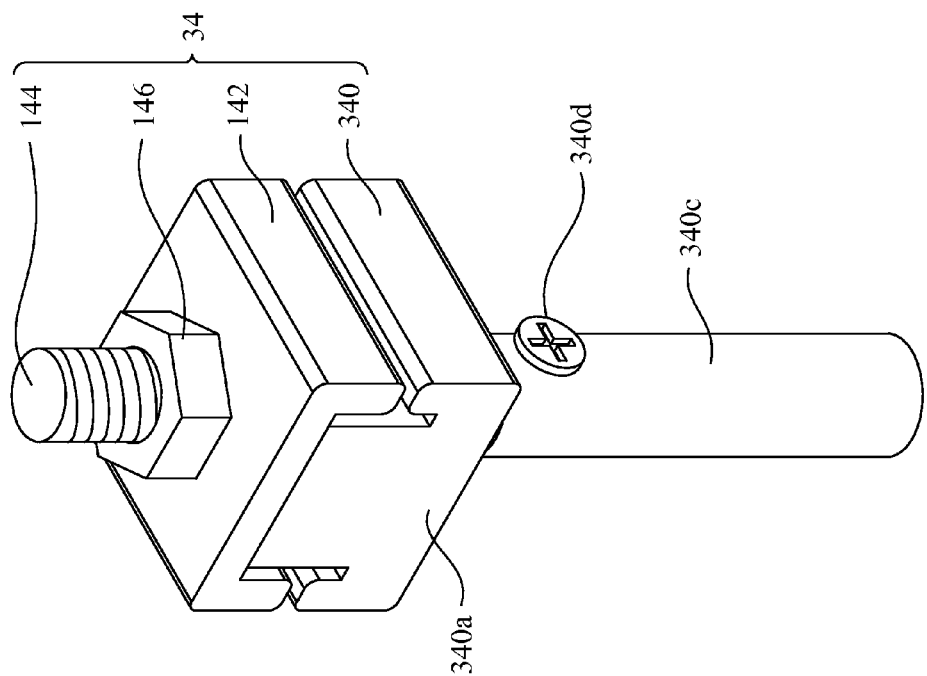
FIG. 12A is a perspective view of the first clamping assembly in FIG. 11, in which the fastening member is fastened to a first fastening hole and a third fastening hole.

FIG. 11 is a perspective view of a first clamping assembly 34 according to another embodiment of the disclosure, in which a first sleeve 340b, a second sleeve 340c, and a fastening member 340d are separated. In the embodiment of the disclosure, the first sleeve 340b is an inner sleeve, and the second sleeve 340c is an outer sleeve that can be sleevedly connected to the first sleeve 340b, but the disclosure is not limited in this regard. In another embodiment of the disclosure, the first sleeve 340b is an outer sleeve and the second sleeve 340c is an inner sleeve. FIG. 12A is a perspective view of the first clamping assembly 34 in FIG. 11, in which the fastening member 340d is fastened to a first fastening hole 340b1 and a third fastening hole 340c1. FIG. 12B is another perspective view of the first clamping assembly 34 in FIG. 11, in which the fastening member 340d is fastened to a second fastening hole 340b2 and the third fastening hole 340c1.

As shown in FIG. 11, FIG. 12A, and FIG. 12B, a lower clamping member 340 of the first clamping assembly 34 mainly improves the pivotal portion 140d of the first clamping assembly 14 in FIG. 3, and also includes the upper clamping member 142, the second bolt 144, and the nut 146. The first clamping assembly 34 replaces the pivotal portion 140d of the first clamping assembly 14 in FIG. 3 by the first sleeve 340b, the second sleeve 340c, and the fastening member 340d. The first sleeve 340b is connected to a lower body 340a of the lower clamping member 340 and has the first fastening hole 340b1 and the second fastening hole 340b2. The second sleeve 340c is sleevedly connected to the first sleeve 340b and has a third fastening hole 340c1. The first sleeve 340b is capable of rotating relative to the second sleeve 340c, so as to selectively make the first fastening hole 340b1 or the second fastening hole 340b2 of the first sleeve 340b be aligned with the third fastening hole 340c1 of the second sleeve 340c. The fastening member 340d is selectively fastened to the first fastening hole 340b1 and the third fastening hole 340c1 when they are aligned to each other, or fastened to the second fastening hole 340b2 and the third fastening hole 340c1 when they are aligned to each other.

In an embodiment of the disclosure, the first sleeve 340b rotates 90 degrees relative to the second sleeve 340c from the state that the first fastening hole 340b1 is aligned with the third fastening hole 340c1 of the second sleeve 340c to the state that the second fastening hole 340b2 is aligned with the third fastening hole 340c1 of the second sleeve 340c. Therefore, when the fastening member 340d is fastened to the first fastening hole 340b1 and the third fastening hole 340c1 that are aligned to each other, the first clamping assembly 34 of the embodiment can clamp the first clamped edge 200 of the frame 20 like the first clamping assembly 14 in FIG. 1.

In another embodiment of the disclosure, if the right and left sides of the frame 20 in FIG. 1 additionally include clamped edges (not shown), the first clamping assembly 34 of the embodiment can achieve the purpose of clamping the clamped edges at the right and left sides of the frame 20 by fastening the fastening member 340d to the second fastening hole 340b2 and the third fastening hole 340c1 that are aligned to each other without changing the installation direction of the first supporting element 12.

In an embodiment of the disclosure, the fastening member 340d is a screw, but the disclosure is not limited in this regard.

However, the angle that first sleeve 340b rotates relative to the second sleeve 340c from the state that the first fastening hole 340b1 is aligned with the third fastening hole 340c1 of the second sleeve 340c to the state that the second fastening hole 340b2 is aligned with the third fastening hole 340c1 of the second sleeve 340c is not limited to 90 degrees and can be adjusted as needed.

Figure 13:
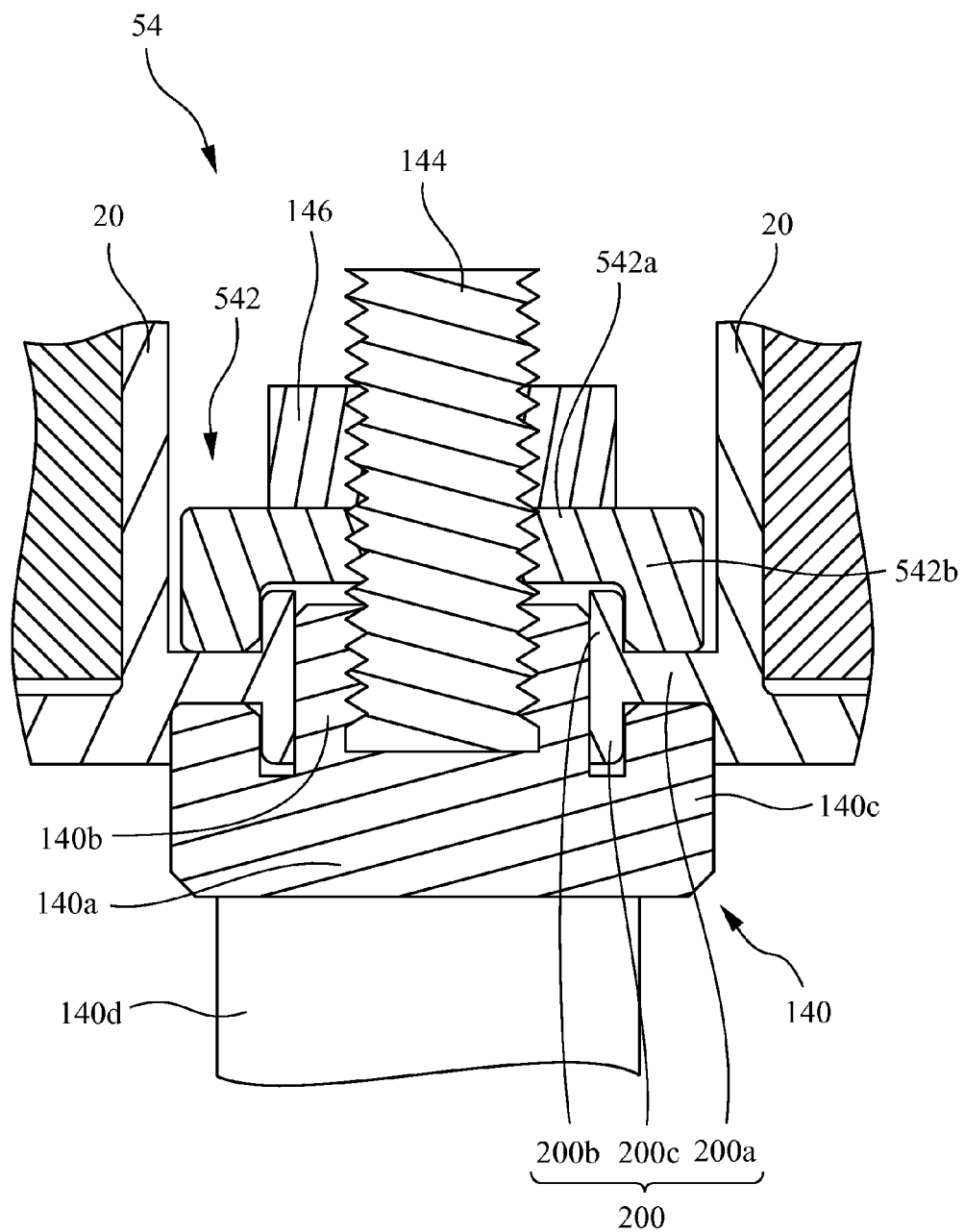
FIG. 13 is a partial sectional view showing that a first clamping assembly clamps two frames according to another embodiment of the disclosure.

FIG. 13 is a partial sectional view showing that a first clamping assembly 54 clamps two frames 20 according to another embodiment of the disclosure.

As shown in FIG. 13, the first clamping assembly 54 includes a lower clamping member 140, an upper clamping member 542, a second bolt 144, and a nut 146. The lower clamping member 140, the second bolt 144, and the nut 146 are similar to the embodiment in FIG. 7, so the descriptions related to FIG. 7 can be referred and do not repeatedly recited here.

It should be pointed out that in the embodiment in FIG. 7, only the lower abutting portion 140c of the lower clamping member 140 and the upper abutting portion 142b of the upper clamping member 142 at the right side of the first clamping assembly 14 clamp the first clamped edge 200, so two sides of the upper clamping member 142 in FIG. 7 are asymmetric (i.e., the lengths of the abutting portions 142b respectively at two sides of the upper clamping member 142 are not equal, and the length of the abutting portion 142b at the right side that clamps the first clamped edge 200 is shorter).

However, in the embodiment of the disclosure, the first clamping assembly 54 use two lower abutting portions 140c at two sides of the lower clamping member 140 and two upper abutting portions 542b at two sides of the upper clamping member 542 to clamp the first clamped edges 200 of the frames 20 at two sides of the first clamping assembly 54, so two sides of the upper clamping member 542 of the embodiment is symmetric (i.e., the upper abutting portions 542b respectively connected two edges of an upper body 542a of the upper clamping member 542 have the same length).

Figure 14:
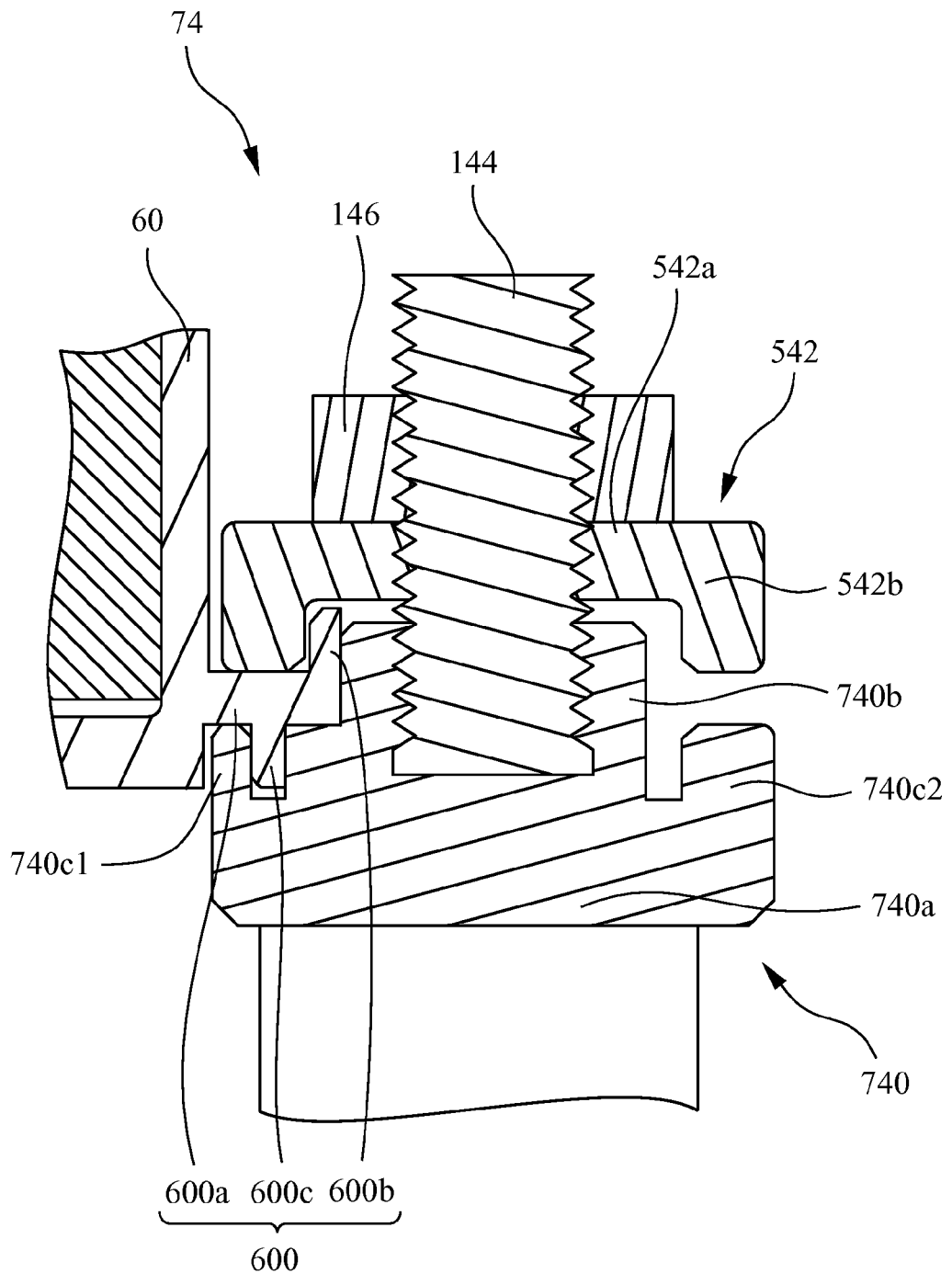
FIG. 14 is a partial sectional view showing that a first clamping assembly clamps a frame according to another embodiment of the disclosure.

FIG. 14 is a partial sectional view showing that a first clamping assembly 74 clamps a frame 60 according to another embodiment of the disclosure.

As shown in FIG. 14, the first clamping assembly 74 includes a lower clamping member 740, an upper clamping member 542, a second bolt 144, and a nut 146. The upper clamping member 542, the second bolt 144, and the nut 146 are similar to the embodiment in FIG. 7, so the descriptions related to FIG. 13 can be referred and do not repeatedly recited here.

It should be pointed out that both of the lower clamping member 140 and the upper clamping member 542 in FIG. 13 is symmetric, and the upper abutting portion 542b and the lower abutting portion 140c at each side of the first clamping assembly 54 clamp the first clamped edge 200 of which the first extension portion 200b and the second extension portion 200c are located at the end of the connection portion 200a and aligned with each other.

However, the lower clamping member 740 of the first clamping assembly 74 of the embodiment is asymmetric, so as to be used to clamp the first clamped edge 600 of the frame 60 of which the first extension portion 600b and the second extension portion 600c are not aligned with each other. As shown in FIG. 14, two sides of a bolt mount 740b disposed on a lower body 740 a of the lower clamping member 740 are asymmetric, and lower abutting portions 740c1, 740c2 respectively located two edges of the lower body 740a are also asymmetric. In order to clamp the second extension portion 600c that is not connected to the end of connection portion 600a, the width of the lower abutting portion 740c1 at the left side of the lower clamping member 740 is smaller than the width of the lower abutting portion 740c2 at the right side of the lower clamping member 740, and the appearance of the bolt mount 740b at the left side is more protruding than at the right side.

In the embodiment of the disclosure shown in FIG. 14, the upper abutting portion 542b and the lower abutting portion 742c2 at the right side of the first clamping assembly 74 do not clamp a clamped edge of another frame. In another embodiment of the disclosure, the upper abutting portion 542b and the lower abutting portion 742c2 in FIG. 14 can also be designed like the upper abutting portion 142b and the lower abutting portion 140c in FIG. 7 that abuts against to each other, but the disclosure is not limited in this regard.

According to the foregoing recitations of the embodiments of the disclosure, it can be seen that a solar module adopts at least one supporting element and at least one clamping assembly that are lightweight and can be quickly assembly to support a frame of the solar module, so as to replace a conventional supporting assembly that has a plurality of lateral and longitudinal brackets. A protruding portion of a pivotal member of the disclosure is selectively engaged with one of dented portions of the supporting element and one of dented portions of the clamping assembly, so that the clamping assembly can support the frame at different tilted states. A clamped edge of the frame of the disclosure forms a protruding structure having special shape and can be clamped by the two-piece clamping assembly, so that the frame can be fixed relative to the clamping assembly in three directions that are perpendicular to each other. Furthermore, the solar module of the disclosure is lightweight and modularized, so the sizes and the quantity of components included in the solar module can be reduced, thereby obtaining advantages of reducing assembly hours and costs.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A solar module comprising:
a first supporting element having a first fixing hole, the first fixing hole having a first dented portion and a second dented portion, wherein a first angle is formed between two connection lines respectively connecting apexes of the first dented portion and the second dented portion to a center of the first fixing hole;
a first clamping assembly comprising a lower clamping member and an upper clamping member fastened to each other and having a second fixing hole, the second fixing hole having a third dented portion and a fourth dented portion, wherein a second angle is formed between two connection lines respectively connecting apexes of the third dented portion and the fourth dented portion to a center of the second fixing hole, and the second angle is not equal to the first angle;
a first pivotal member pivotally connected to the first fixing hole and the second fixing hole and having a protruding portion; and
a frame having a first clamped edge clamped between the lower clamping member and the upper clamping member;
wherein the protruding portion of the first pivotal member is selectively engaged with the first dented portion and the third dented portion to make the first clamping assembly support the frame at a first tilted state, or is engaged with the second dented portion and the fourth dented portion to make the first clamping assembly support the frame at a second tilted state.

2. The solar module of claim 1, wherein the first angle is equal to 180 degrees, and the second angle is not equal to 180 degrees.

3. The solar module of claim 1, wherein the first angle is not equal to 180 degrees, and the second angle is equal to 180 degrees.

4. The solar module of claim 1, wherein the frame further has a second clamped edge, the first clamped edge and the second clamped edge are respectively located at two opposite sides of the frame, and the solar module further comprises:
a second supporting element having a fifth fixing hole and a sixth fixing hole;
a second clamping assembly having a seventh fixing hole, the second clamping assembly for clamping the second clamped edge, wherein the fifth fixing hole is aligned with the seventh fixing hole when the frame is at the first tilted state, and the sixth fixing hole is aligned with the seventh fixing hole when the frame is at the second tilted state; and a second pivotal member selectively pivotally connected to the fifth fixing hole and the seventh fixing hole corresponding to the first tilted state, or pivotally connected to the sixth fixing hole and the seventh fixing hole corresponding to the second tilted state.

5. The solar module of claim 1, wherein the first pivotal member further has a retaining portion and a threaded hole, the retaining portion is located at an end of the first pivotal member, the solar module further comprises a first bolt, the first bolt has a bolt head, and the first bolt is fastened into the threaded hole from another end of the first pivotal member opposite to the retaining portion, so as to clamp the first supporting element and the first clamping assembly between the retaining portion and the bolt head.

6. The solar module of claim 1, wherein the first clamped edge is a protruding structure laterally protruding from the frame.

7. The solar module of claim 6, wherein a cross section of the first clamped edge is X-shaped.

8. The solar module of claim 6, wherein a cross section of the first clamped edge is T-shaped.

9. The solar module of claim 6, wherein the first clamped edge comprises:
   a connection portion connected to the frame and having a first supporting surface and a second supporting surface, wherein the first supporting surface and the second supporting surface are respectively located at two opposite sides of the connection portion;
   a first extension portion connected to the first supporting surface; and
   a second extension portion connected to the second supporting surface.

10. The solar module of claim 9, wherein the first clamping assembly comprises:
   the lower clamping member comprising:
      a lower body;
      a bolt mount connected to the lower body; and
      a lower abutting portion connected to the lower body and located at an edge of the lower body for abutting the second supporting surface;
   the upper clamping member comprising:
      an upper body having a through hole; and
      an upper abutting portion connected to the upper body and located at an edge of the upper body for abutting the first supporting surface;
   a second bolt fixed to the bolt mount and passing through the through hole; and
   a nut fastened to the second bolt, so as to clamp the upper clamping member between the nut and the lower clamping member;
   wherein the connection portion is clamped between the upper abutting portion and the lower abutting portion, the first extension portion is clamped between the upper abutting portion and the bolt mount, and the second extension portion is engaged between the lower abutting portion and the bolt mount.

11. The solar module of claim 10, wherein the lower clamping member further comprises a pivotal portion connected to the lower body, the pivotal portion and the bolt mount are respectively located at two opposite sides of the lower body, and the first fixing hole is located at the pivotal portion.

12. The solar module of claim 11, wherein the pivotal portion further comprises:
   a first sleeve connected to the lower body and having a first fastening hole and a second fastening hole;
   a second sleeve connected to the first sleeve in a nested arrangement and having a third fastening hole, wherein the first sleeve is capable of rotating relative to the second sleeve, so as to selectively make the first fastening hole or the second fastening hole be aligned with the third fastening hole; and
   a fastening member selectively fastened to the first fastening hole and the third fastening hole that are aligned to each other, or fastened to the second fastening hole and the third fastening hole that are aligned to each other.

* * * * *